United States Patent
Pawlowski

[19]

[11] Patent Number: 6,148,374
[45] Date of Patent: *Nov. 14, 2000

[54] MULTI-WAY CACHE EXPANSION CIRCUIT ARCHITECTURE

[75] Inventor: J. Thomas Pawlowski, Boise, Id.

[73] Assignee: Micron Technology, Inc., Boise, Id.

[ * ] Notice: This patent is subject to a terminal disclaimer.

[21] Appl. No.: 09/109,583

[22] Filed: Jul. 2, 1998

Related U.S. Application Data

[63] Continuation of application No. 08/559,158, Nov. 17, 1995, Pat. No. 5,845,317.

[51] Int. Cl.⁷ .................................................. G06F 12/08
[52] U.S. Cl. ........................ 711/128; 711/136; 711/160; 711/144
[58] Field of Search .................................. 711/128, 136, 711/160, 144

[56] References Cited

U.S. PATENT DOCUMENTS

| | | | |
|---|---|---|---|
| 4,322,795 | 3/1982 | Lange et al. | 711/128 |
| 4,493,026 | 1/1985 | Olnowich | 711/136 |
| 4,736,287 | 4/1988 | Druke et al. | 711/128 |
| 4,831,625 | 5/1989 | Chiu et al. | 714/805 |
| 4,991,081 | 2/1991 | Bosshart | 711/3 |
| 5,014,195 | 5/1991 | Farrell et al. | 711/128 |
| 5,091,851 | 2/1992 | Shelton et al. | 711/128 |
| 5,202,968 | 4/1993 | Sato | 711/120 |
| 5,274,790 | 12/1993 | Suzuki | 711/133 |
| 5,367,653 | 11/1994 | Coyle et al. | 711/128 |
| 5,586,279 | 12/1996 | Pardo et al. | 711/3 |

*Primary Examiner*—Reginald G. Bragdon
*Attorney, Agent, or Firm*—Kirkpatrick & Lockhart LLP

[57] ABSTRACT

An expandable-set, tag, cache circuit for use with a data cache memory comprises a tag memory divided into a first set and a second set for storing, under a single address location, first and second tag fields representative of first and second data, respectively. The tag memory also stores first and second signals representative of which of the sets is the least recently used. A comparator is responsive to a tag field of an address representative of requested data as well as to a first tag field output from the tag memory for producing an output signal indicative of a match therebetween. A second comparator is responsive to the same tag field of the address and to a second tag field output from the tag memory for producing an output signal indicative of a match therebetween. A first logic gate is responsive to the first and second comparators for producing an output signal indicative of the availability of the requested data in the data cache memory. A second logic gate is responsive to the first logic gate and an external signal. A first write driver is enabled by the output of the first logic gate and is responsive to the output of the first comparator for controlling the state of the first signal. A second write driver is enabled by the output of the second logic gate and is responsive the to external signal for controlling the state of the second signal.

7 Claims, 4 Drawing Sheets

MULTI-WAY CACHE EXPANSION CIRCUIT ARCHITECTURE

CROSS-REFERENCE TO RELATED APPLICATIONS

This a continuation of U.S. patent application Ser. No. 08/559,158 filed on Nov. 17, 1995 and issued as U.S. Pat. No. 5,845,317.

BACKGROUND OF THE INVENTION

1. Field of the Invention

The present invention relates to the field of computer memory architecture and, more particularly, to cache memories used in conjunction with Static Random Access Memories (SRAM) to improve overall performance.

2. Description of the Background

The central processing unit (CPU) of a computer typically operates at a much faster speed than the access time of the memory to which the CPU is connected. The problem is exacerbated by the fact that memory arrays having a high density, which typically makes them less expensive then memory arrays having a lower density, are often slower than memory arrays which have a lower density. Thus, there is always a trade off between speed and cost.

To help ameliorate the effects of that trade off, computer designers use both types of memory. The relatively slower memory, which is inexpensive, is used to provide the vast bulk of the memory required and is referred to as the main memory. The more expensive, faster memory, is provided as a buffer between the CPU and the main memory, and is referred to as cache memory.

Studies have been conducted to identify the information stored in the main memory which should also be stored in the cache memory. Obviously, the more often the CPU can find the information that it needs in the cache memory, rather than having to go to the slower main memory, the faster the CPU can operate. Sophisticated algorithms have been developed to determine what information should be maintained in the cache memory and what information should be overwritten when new information is to be stored.

It is known to organize cache memory according to certain mapping techniques. For example, see U.S. Pat. No. 5,367,653 which is entitled Reconfigurable Multi-Associative Cache Memory. One type of mapping is referred as direct mapping. In that mapping scheme, a main memory address is divided into two fields, an index field comprised of the least significant bits of an address and a tag field comprised of the remaining significant bits of the address. The entire address, i.e., the tag field and the index field, is needed to access the main memory, while only the index field is needed to access the cache memory. The remainder of the address, i.e., the tag field, is stored in the tag memory, sometimes referred to as a tag cache. In operation, the index field from an address for a requested piece of data is input to the tag cache, and the tag associated with that address is output. If the tag output from the tag cache matches the tag field of the requested data, then a hit results indicating that the requested data is in the data cache. If there is a miss, the data must be retrieved from the main memory.

Other types of mapping techniques are also known. For example, in fully associative mapping, the cache memory stores both the main memory address and the data word thus allowing a word from main memory to be stored in any location in the cache memory. For example, if a fifteen-bit main memory address is located in an argument register, and the contents of the argument register are compared with the main memory addresses stored in associative cache memory, a hit results when the contents of the argument register equals one of the main memory addresses stored in cache memory.

Another type of mapping, referred to as set-associative mapping, permits the storage of two or more words in cache memory at the same index address. The data words stored in the cache memory at the same index are each associated with a tag. The number of tag/word pairs stored at one address forms a "set". A cache memory which has multiple cache words at one cache address is referred to as a multi-way cache. Thus, a cache memory which provides for two words to be stored under a single address is referred to as a two-way cache. A cache memory which stores four words under a single address is referred to as a four-way cache. Because the cache memory utilizes an associative mapping function, the cache memory may be referred to as a two-way, set associative cache or a four-way, set associative cache, respectively.

Different configurations of cache memory are used for different applications. For example, two-way set associative cache is often adequate for instruction whereas four-way set associative cache often provides better performance for data. The type of cache memory can be established by proper hardware selection if the particular use is known. If the particular use is not known, the reconfigurable multi-way associative cache memory disclosed in the aforementioned U.S. Pat. No. 5,367,653 may be used. However, there remains a need for a tag cache circuit which is sufficiently flexible to enable it to be easily modified so as to expand the number of ways. Such a circuit should provide the flexibility of a software configurable cache memory while at the same time providing the advantages provided by a hard-wired circuit.

SUMMARY OF THE INVENTION

The present invention is directed to an expandable set, tag, cache circuit for use with a data cache memory. A tag memory is divided into a first set and a second set for storing under a single address location, first and second tag fields representative of first and second data, respectively. The tag memory also stores first and second signals representative of which of the sets is the least recently used. A comparator is responsive to a tag field of an address representative of requested data as well as to a first tag field output from the tag memory for producing an output signal indicative of a match therebetween. A second comparator is responsive to the same tag field of the address and to a second tag field output from the tag memory for producing an output signal indicative of a match therebetween. A first logic gate is responsive to the first and second comparators for producing an output signal indicative of the availability of the requested data in the data cache memory. A second logic gate is responsive to the first logic gate and an external signal. A first write driver is enabled by the output of the first logic gate and is responsive to the output of the first comparator for controlling the state of the first signal. A second write driver is enabled by the output of the second logic gate and is responsive to the external signal for controlling the state of the second signal. Although this is described as a two-way tag, the concept applies equally to higher degrees of associativity. LRU2 (i.e., additional line replacement bit) is the necessary storage element required to facilitate expansion.

The circuit of the present invention may be used as a two-way set associative cache by tying the external signal to either a high or low voltage, depending upon the components used. Alternatively, by providing a duplicate circuit and by using the output of one circuit as the external signal input to the other circuit, a four-way set associative cache can be provided. Thus, the circuit architecture of the present invention provides an expandable-set, tag, cache circuit which provides all of the advantages of a hard-wired circuit with the flexibility normally found only in software configured cache memory. Those, and other advantages and benefits of the present invention will become apparent from the Detailed Description Of The Preferred Embodiments hereinbelow.

BRIEF DESCRIPTION OF THE DRAWINGS

For the present invention to be clearly understood and readily practiced, the present invention will be described in conjunction with the following figures wherein.

DETAILED DESCRIPTION OF THE PREFERRED EMBODIMENTS

Figure 1:
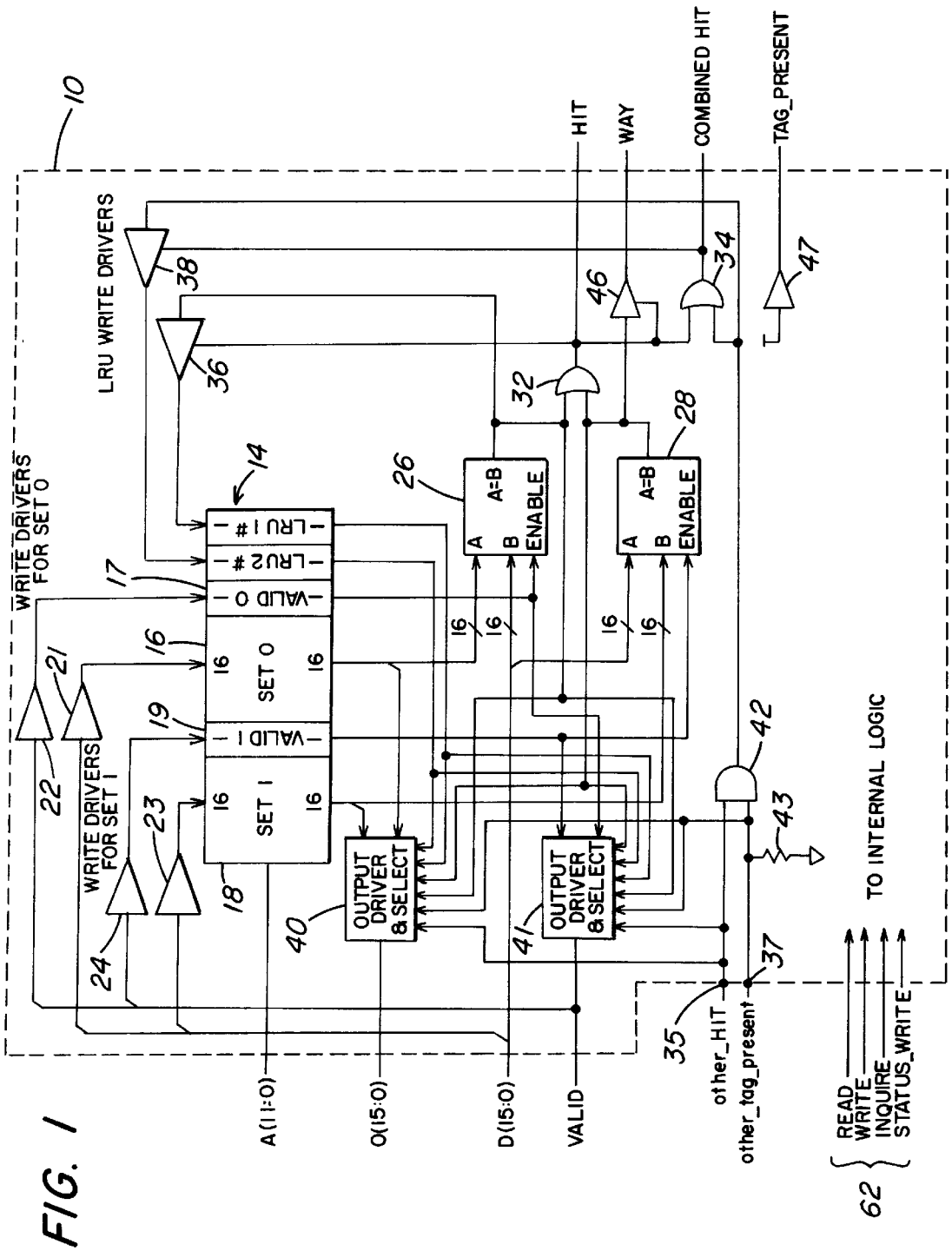
FIG. 1 illustrates an expandable-set, tag, cache circuit constructed according to the teachings of the present invention and implementing a two-way, set associative cache.
Figure 2:
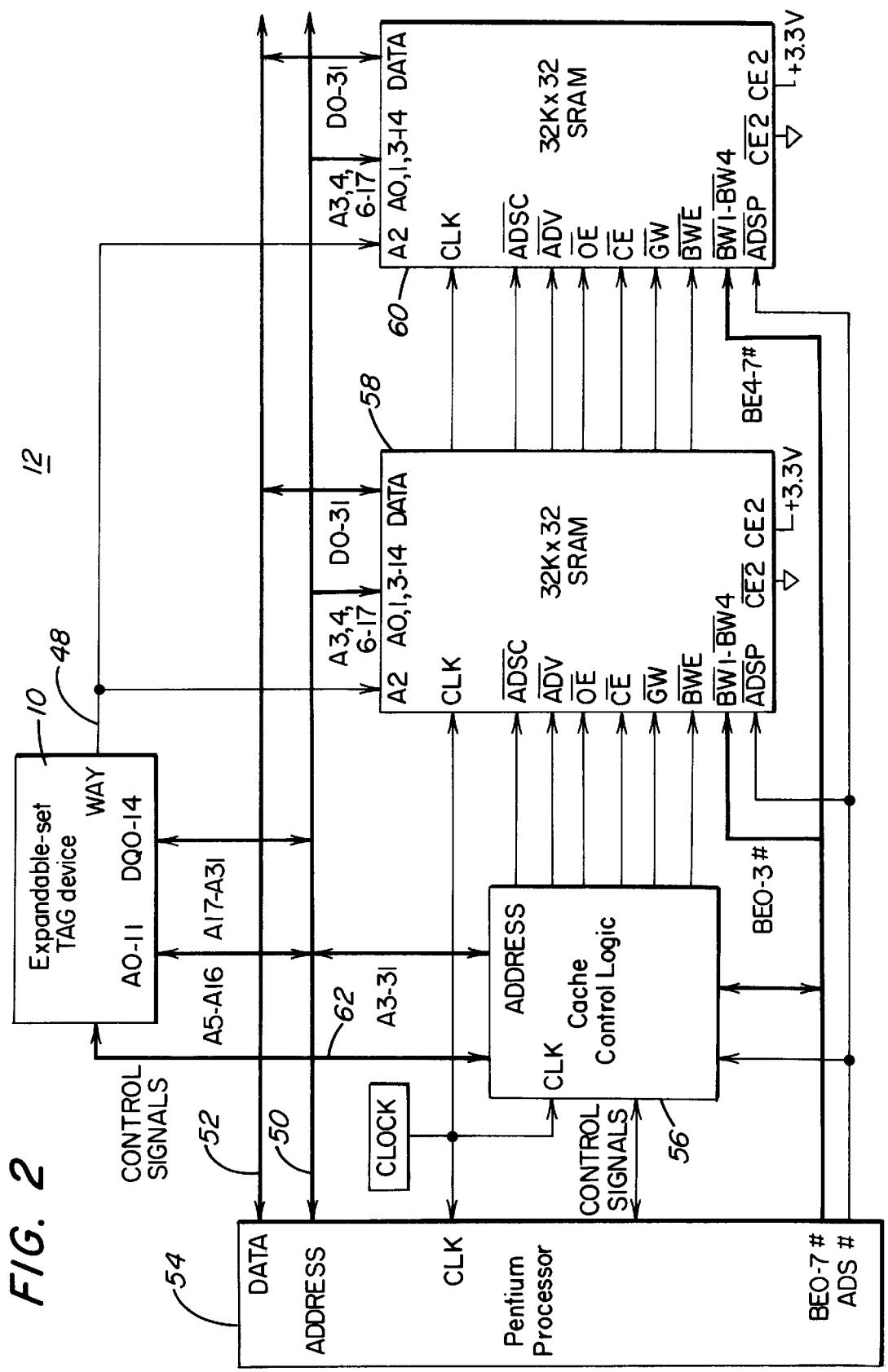
FIG. 2 is a block diagram illustrating a single, expandable-set, cache circuit shown in a cache subsystem.

In FIG. 1, an expandable set, tag, cache circuit 10 constructed according to the teachings of the present invention is illustrated. The circuit 10 may be a part of a cache subsystem of a solid state device 12, illustrated in FIG. 2 in block diagram form, which is provided for purposes of illustrating one environment in which the circuit 10 of the present invention may be implemented. In FIG. 2, an address bus 50 and a data bus 52 interconnect a microprocessor 54 with circuit 10, cache control logic 56, and data cache 58, 60 in a standard manner. Cache control logic 56 provides control signals 62 such as READ, WRITE, INQUIRE, and STATUS_WRITE in a known manner, and receives control signals such as combined_HIT. The purpose of the circuit 10 illustrated in FIG. 2 is to improve performance over the improvement in performance expected from cache size expansion alone. As will be described, by adding extra sets of associativity, performance is improved because more degrees of freedom exist for storing any one datum.

Returning to FIG. 1, a tag cache 14 is responsive to address lines A[11:0] in a conventional manner to access a particular location in tag cache 14. The tag cache 14 is also responsive to data lines D[15:0] which carry information commonly referred to as the tag field.

The tag cache 14 is divided into a first set 16 ("set 0") and a second set 18 ("set 1") for storing, under a single address location defined by address lines A[11:0], first and second tag fields defined by lines D[15:0] and representative of first and second data, respectively. Also associated with the first set 16 is an array of bits 17 used to indicate that a current tag entry is valid. A similar array of bits 19 is associated with second set 18. When the signal output from array 17 or 19 is a logic level 1, that indicates that the current tag entry is valid. The present architecture applies equally to any manner of status bit implementation such as MESI, valid-dirty, etc.

The tag field defined by lines D[15:0] is written to the first set 16 by a write driver 21 while the status of the valid bit in array 17 is written by a write driver 22. The tag field may also be written to the second set 18 by a write driver 23. The status of the valid bit in the array 19 is controlled by a write driver 24.

The tag cache 14 also has associated therewith an array of bits referred to as LRU1 and a second array of bits referred to as LRU2. The purpose of the bits in the array LRU1 is to determine which set, 16 or 18, is the least recently used. If the bit in the array LRU1 is set to 1, that indicates that second set 18 is the least recently used set. Conversely, if the bit is set to 0, that indicates that first set 16 is the least recently used set. The use of the array LRU1 to identify which set is the least recently used is known in the art. The addition of the second array LRU2 is to provide expandability with respect to the number of ways. In the embodiment illustrated in FIG. 1, the circuit 10 is set up for a two-way cache such that the array LRU2 is not used. Nevertheless, the function of the array LRU2 will be described hereinbelow after the remainder of the elements illustrated in FIG. 1 have been described.

The circuit 10 illustrated in FIG. 1 additionally comprises a first comparator 26 responsive at input terminals A to a tag field output from the first set 16 of tag cache 14 and is responsive at second input terminals B to a tag field defined by lines D[15:0] associated with a piece of requested data addressed through address bus 50. An enable input terminal of the first comparator 26 is responsive to the array 17 which provides a "valid" signal indicative of whether the tag output by the first set 16 is valid. The first comparator 26 produces a signal at an output terminal thereof indicative of a match between the tag fields input at terminals A and B.

In a similar fashion, a second comparator 28 is responsive at input terminals A to the tag portion of the address of the requested data and is responsive at second input terminals B to a tag field output from the second set 18 of the cache memory 14. An enable input terminal of the comparator 28 is responsive to a "valid" signal output from array 19. A signal available at the output of the second comparator 28 is indicative of a match between the tag fields input at input terminals A and B.

The circuit 10 illustrated in FIG. 1 is also comprised of a first logic gate 32, which is an OR gate responsive to the output of comparator 26 and the output of comparator 28. An AND gate 42 is responsive to an other_HIT signal input at an input terminal 35 and an other_tag_present signal input at input terminal 37 to produce a combined external signal. Input terminal 37 is connected to ground through a resistor 43. A second logic gate 34 is responsive to the output of the logic gate 32 and is also responsive to the combined external signal. A first write driver 36 has an input terminal responsive to the output of comparator 26 and an enable terminal responsive to the output of the first logic gate 32. A second write driver 38 has an input terminal responsive to the combined external signal and an enable terminal responsive to the output of logic gate 34. An output buffer 47 produces a tag_present signal.

Completing the description of FIG. 1, a first output driver and select circuit 40 receives the following input signals: other_HIT signal, other_tag_present signal, the signal output by the first comparator 26, the signal output by the second comparator 28, a signal from the array LRU1, a signal from the array LRU2, and the READ signal. Output driver and select circuit 40 also receives the tag field output by the first set 16 as well as the tag field output by the second set 18. The purpose of the output driver and select circuit 40 is to determine whether the tag field output by the first set 16 or the tag field output by the second set 18 is to be output by the circuit 10.

A second output driver and select circuit 41 receives the same input signals as the first output driver and select circuit 40. However, instead of receiving the tag fields output by the first set 16 and the second set 18, the second output driver and select circuit 41 receives the valid signal output by the array 17 and the valid signal output by the array 19. The purpose of the second output driver and select circuit 41 is to determine whether the valid signal produced by array 17 or the valid signal produced by array 19 is to be output by the circuit 10. The circuits 40 and 41 are described in more detail in conjunction with FIG. 4 hereinbelow.

The circuit 10 shown in FIG. 1 is used to implement a two-way, set associative cache. In that implementation, the other_HIT signal available at input terminal 35 is tied to a low potential, representative of a logic level 0. The pull down resistor 43 makes certain that circuit 10 defaults to the "no other tag present" condition. Under those circumstances, the state of the combined external signal will not change from a logical value of 0. Thus, when there is a hit based on a tag found in set 16, the output of the first comparator 26 goes, for example, high. That high signal is input to the input terminal of the write driver 36. That high signal also propagates through the first logic gate 32 to the enable input terminal of write driver 36 such that a logic 1 is written into the array LRU1 thereby indicating that set 18 is the least recently used set. The high signal produced by the first comparator 26 is also available on a line 44 to indicate that the requested data is available in the data cache 14 (i.e. a HIT) and may be accessed therefrom.

Assuming now that there is a hit based on a tag stored in set 18, the second comparator 28 produces, for example, a high signal, which propagates through the first logic gate 32 thereby providing an indication on line 44 that the data may be found in the data cache. The high signal is also input to the enable terminal of the write driver 36 which has at its input terminal a logic 0 because of the operation of comparator 26, i.e., because a HIT in set 18 can only be true if a miss in set 16 is true. Stated another way, the same address cannot be present in both sets simultaneously. Under those conditions, a logic 0 is written into the array LRU1 which indicates that the set 16 is the least recently used set.

The high signal output by the second comparator 28 is also input at the input terminal of a driver 46. An enable input terminal of the driver 46 is responsive to the output of the first logic gate 32. Thus, when the signal produced by the second comparator 28 goes high, that high signal is input to driver 46 and enables driver 46 through first logic gate 32, so that a WAY signal available on a line 48 goes high. Conversely, if the first comparator 26 produces a high signal which propagates through gate 32 thereby enabling driver 46, and the output of the second comparator is low, the WAY signal available on line 48 is low. In that manner, the WAY signal provides an indication of whether the tag was found in the first set 16 or the second set 18. As shown in FIG. 2, the WAY signal available on line 48 is input to cache memories 58, 60.

Because the implementation illustrated in FIG. 1 is only a two-way associative set, and the signal available at the input terminal 35 is constant, the array LRU2 provides no function. That is, whenever the write driver 38 is enabled by a signal propagating through the second logic gate 34, the signal available at the input terminal of the write driver 38 is always the same. Therefore, the signals stored in the array LRU2 are of no importance in the embodiment shown in FIG. 1. Similarly, a COMBINED HIT signal available on an output line 49 from the second logic gate 34 contains no information in addition to the information available on line 44. However, the array LRU2 and the ability of the circuit 10 to handle external signals at input terminals 35 and 37 allow the cache architecture to be expanded as shown in FIG. 3.

Figure 3:
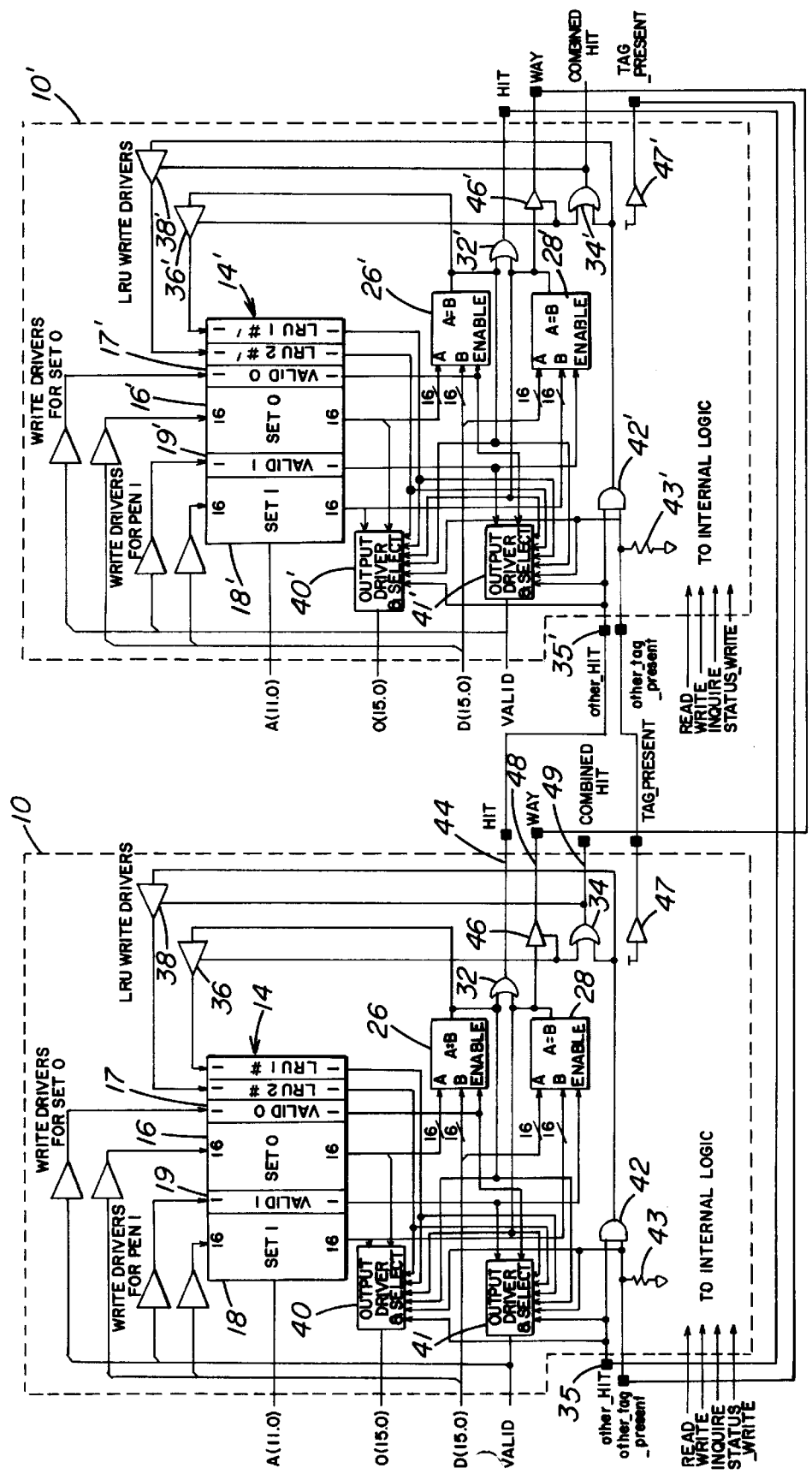
FIG. 3 illustrates the circuit of FIG. 1 connected to implement a four-way, set associative cache.

In FIG. 3, a four-way, set associative cache architecture is illustrated. As will be seen, the four-way, set associative cache architecture is achieved primarily by providing two circuits 10 interconnected as shown. In the second circuit 10', a second tag memory 14' is provided. A third comparator 26' is responsive to a tag field stored in a first set 16' as well as the tag field defined by lines D[15:0]. A fourth comparator 28' is responsive to a tag field stored in second set 18' and the tag field defined by lines D[15:0]. The third comparator 26' has an enable input terminal responsive to a third "valid" signal output from an array 17' while the fourth comparator 28' has an enable input terminal responsive to a fourth "valid" signal output from an array 19'.

A third logic gate 32' is responsive to the outputs of third comparator 26' and fourth comparator 28'. A fourth logic gate 34' is responsive to the output of the third logic gate 32' and is responsive to the output of AND gate 42'. A third write driver 36' receives at its input terminal a signal output by the third comparator 26' and is enabled by the signal output by the third logic gate 32'. A fourth write driver 38' receives at its input terminal the signal output by the AND gate 42' and receives at an enable input terminal the signal produced by the fourth logic gate 34'. The signal produced by the third logic gate 32' becomes the HIT signal which is input at input terminal 35 of circuit 10. The signal produced by output buffer 47' becomes the other_tag_present signal input at input terminal 37 of circuit 10.

In the embodiment shown in FIG. 3, the array LRU2 from tag memory 14 and the array LRU2 from tag memory 14' indicate which cache memory 14 or 14' is the least recently used in a manner similar to how array LRU1 of tag memory 14 indicates which set 16 or 18 is the least recently used. For example, LRU2=0 may indicate that the other tag memory was least recently used.

Four basic functions (although there is no reason to limit the number of functions to only four) may be defined as follows:

| function | activity |
| --- | --- |
| Interrogate: | if HIT, LRU1 and LRU2 are updated<br>internal set number = set number of successful compare result (i.e. set number = 0 if HIT came from comparator 0) the integral set number is frozen until a new interrogate command occurs if not HIT:<br>if LRU2# = 0 and other tag present, no action is required<br>if LRU2# = 1 or other tag not present, internal set number = LRU1# |
| Read | Q[15:0] is output from the set selected by the internal set number |
| Write | D[15:0] is written to the set selected by the internal set number |
| Write status | VALID is written to the valid bit selected by the internal set number |

Note: for the foregoing functions, the HIT signal is defined as valid and either set 16 or set 18 equal D[15:0]).

Figure 4:
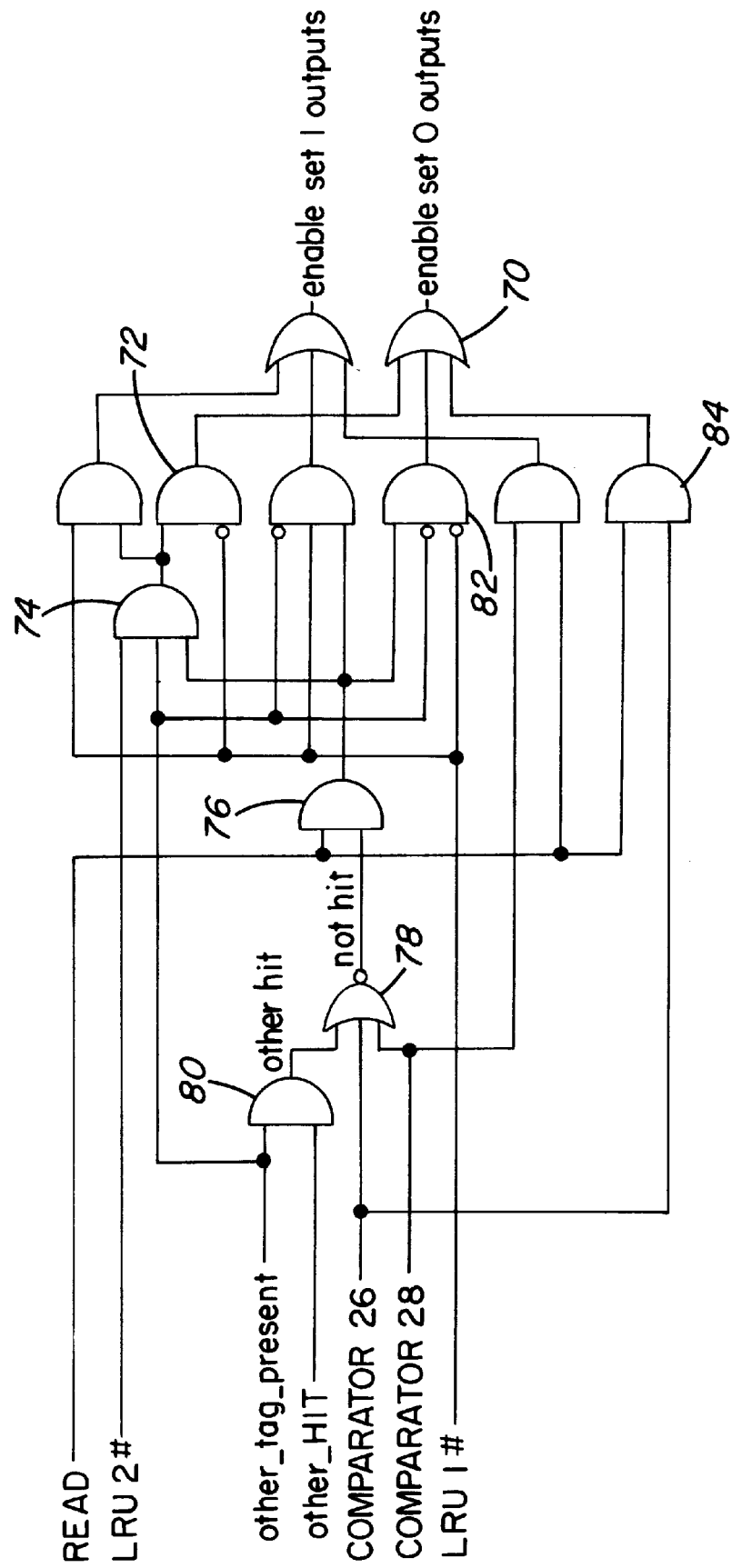
FIG. 4 illustrates the output driver and select circuits.

Turning now to FIG. 4, FIG. 4 demonstrates how the various signals input to the output driver and select circuits 40, 41 are used to enable the output of either set 16 or set 18 or the valid bits from arrays 17 and 19, respectively. The reader will understand that the logic appearing in FIG. 4 is found in both circuits 40 and 40' and 41 and 41'.

In FIG. 4, the output of set 0 is selected via gate 70 if one of three sets of conditions is met. The first set of conditions is imposed by gates 72, 74, 76, 78, and 80. The gate 74 imposes the condition that LRU2 must be high, the other__tag__present signal must be high, and a signal produced by the combination of gates 76, 78, and 80 must also be high. The operation of gates 76, 78, and 80 requires that the READ signal be available which forces an interrogation of the signal LRU2 through gate 72 such that if the inverse of LRU1 is high and the output of gate 74 is high, then the hit resides on this chip.

A second set of conditions under which gate 70 enables the outputs for set 0 is imposed by the gate 82, which is also responsive to the combination of gates 76, 78, and 80. This set of circumstances is similar to the previously described circumstances. When the READ signal is available, and there are no hits in comparator 26 or 28, and the other__HIT signal is low, then if LRU is 0, then set 0 is enabled.

The third set of conditions under which the outputs of set 0 are enabled are imposed by gate 84. If the READ signal is available and comparator 26 indicates a match, then the output of set 0 is enabled. The reader will understand that the logic for enabling the outputs of set 1 is completely orthogonal and therefore need not be described.

The present invention provides an expandable-set, tag, cache circuit which combines the flexibility normally associated with programmable memory with the benefits of hard-wired circuitry. When a two-way, set associative cache is required, all that is needed is for the signal input to input terminal 35 to be set to an appropriate logic level. However, if a four-way, set associative cache is required, all that is needed is for an additional circuit 10 to be inserted and the appropriate connections made. If the additional circuit 10 is already fabricated and on the chip, all that needs to be done is to position appropriate jumpers to expand the cache from a two-way to a four-way, set associative cache. Other degrees of association can be provided.

While the present invention has been described in conjunction with the preferred embodiment, those of ordinary skill in the art will recognize that many modifications and variations are possible. The foregoing disclosure and the following claims are intended to cover all such modifications and variations.

What is claimed is:

1. A method of controlling the state of first and second signals representative of first and second sets in a tag memory which is the least recently used, comprising:

storing, under a single address location in the tag memory, first and second tag fields representative of first and second data, respectively;

storing in the tag memory the first and second signals representative of which of said first and second sets is the least recently used;

producing a first comparative signal indicative of a match between a portion of an address representative of requested data and a first tag field output from the tag memory;

producing a second comparative signal indicative of a match between said portion of an address and a second tag field output from the tag memory;

producing an output signal indicative of the availability of the requested data in response to said first and second comparative signals;

controlling the state of said first signal in response to said output signal and said first comparative signal; and controlling the state of said second signal in response to an external signal and said output signal.

2. The method of claim 1 further comprising:

storing first and second valid signals representative of the validity of said first and second tag fields, respectively; and enabling first and second comparators by the first and second valid signals, respectively.

3. The method of claim 2 further comprising:

implementing the first and second valid signals by a single bit set to one of a value of one and a value of zero.

4. The method of claim 1 further comprising providing the external signal at a constant value to disable the external signal.

5. The circuit of claim 1 additionally comprising:

storing, under a single address location in a second tag memory divided into a third set and a fourth set, third and fourth tag fields representative of third and fourth data, respectively;

storing third and fourth signals representative of which of said third and fourth sets is the least recently used;

producing a third comparative signal indicative of a match between the portion of an address and said third tag field output from said second tag memory;

producing a fourth comparative signal indicative of a match between the portion of an address and said fourth tag field output from said second tag memory;

producing the external signal indicative of the availability of the requested data in the data cache memory in response to said third and fourth comparative signals;

controlling the state of the third signal in response to said third comparative signal and said external signal; and controlling the state of the fourth signal in response to said external signal and said output signal.

6. The method of claim 5, further comprising:

storing third and fourth valid signals representative of the validity of said third and fourth tag fields, respectively; and enabling third and fourth comparators by the third and fourth valid signals, respectively.

7. A method, comprising:

storing first and second tag fields representative of first and second data, respectively, in a tag memory divided into a first set and a second set;

storing first and second signals representative of which of the sets is the least recently used;

producing a first comparative signal indicative of a match between a portion of an address representative of requested data and the first tag field;

producing a second comparative signal indicative of a match between the portion of an address and the second tag field;

producing an output signal indicative of the availability of the requested data in the data cache memory in response to the first and second comparative signals;

controlling the state of the first signal in response to the first comparative signal and the output signal; and controlling the state of the second signal in response to an external signal and the output signal.

* * * * *

UNITED STATES PATENT AND TRADEMARK OFFICE
CERTIFICATE OF CORRECTION

PATENT NO.    : 6,148,374
DATED         : November 14, 2000
INVENTOR(S)   : Pawlowski It is certified that error appears in the above-identified patent and that said Letters Patent is hereby corrected as shown below:

<u>Column 6,</u>
Fifth line of chart, after "the", delete "integral" and replace therewith -- internal --.

Signed and Sealed this

Second Day of July, 2002

Attest:

Attesting Officer

JAMES E. ROGAN
Director of the United States Patent and Trademark Office